(12) United States Patent
Miller et al.

(10) Patent No.: US 8,528,101 B1
(45) Date of Patent: Sep. 3, 2013

(54) INTEGRATED PHYSICAL SECURITY CONTROL SYSTEM FOR COMPUTING RESOURCES

(75) Inventors: Kevin C. Miller, Herndon, VA (US); Peter C. Beckman, Falls Church, VA (US)

(73) Assignee: Amazon Technologies, Inc., Reno, NV (US)

( * ) Notice: Subject to any disclaimer, the term of this patent is extended or adjusted under 35 U.S.C. 154(b) by 19 days.

(21) Appl. No.: 13/237,771

(22) Filed: Sep. 20, 2011

(51) Int. Cl.
*H04L 29/06* (2006.01)

(52) U.S. Cl.
USPC ............................................ 726/26; 713/194

(58) Field of Classification Search
None
See application file for complete search history.

(56) References Cited

U.S. PATENT DOCUMENTS

| | | | |
|---|---|---|---|
| 2003/0145218 A1* | 7/2003 | Hutchison | 713/200 |
| 2005/0066200 A1* | 3/2005 | Bahl et al. | 713/201 |
| 2005/0138406 A1* | 6/2005 | Cox | 713/200 |
| 2008/0134177 A1* | 6/2008 | Fitzgerald et al. | 718/1 |
| 2009/0044265 A1* | 2/2009 | Ghosh et al. | 726/14 |
| 2011/0072506 A1* | 3/2011 | Law et al. | 726/11 |
| 2011/0302415 A1* | 12/2011 | Ahmad et al. | 713/168 |

* cited by examiner

*Primary Examiner* — Gilberto Barron, Jr.
*Assistant Examiner* — Malcolm Cribbs
(74) *Attorney, Agent, or Firm* — Woodcock Washburn, LLP

(57) ABSTRACT

A computing data center that contains a set of physically isolatable units of computing resources for which a physical security exception action plan is to be provided. Upon determining that a security event has occurred for one or more physically isolatable units, the computing data center implements physical security settings on potentially affected computing resources so that a physical security exception action plan can be met. The computing data center may, for example, remove data from the physically isolatable units and make the removed data available elsewhere.

22 Claims, 8 Drawing Sheets

INTEGRATED PHYSICAL SECURITY CONTROL SYSTEM FOR COMPUTING RESOURCES

BACKGROUND

A data center is a facility that houses computer systems and various networking, storage, and other related components. Many organizations and businesses operate and maintain data centers to provide computing and information services to support their day to day operations. Data centers may also provide computing services to businesses and individuals as a remote computing service or to provide "software as a service" (e.g., "cloud" computing). The services provided by data centers are extremely important to businesses as the continued and reliable availability of the computing services are important to the business's ongoing operations. It is thus necessary to provide reliable and secure computing services in order to minimize disruptions to customers of the computing services. Security is an important concern not only for service reliability but also for the protection of a customer's valuable and proprietary information. A data center must therefore implement a secure computing environment in order to provide such protections.

BRIEF DESCRIPTION OF THE DRAWINGS

The systems, methods, and computer readable media for physically securing data using a security policy in accordance with this specification are further described with reference to the accompanying drawings in which.

DETAILED DESCRIPTION

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Many computer security mechanisms focus on the protection of information from theft and other security exceptions by preventing unauthorized access to computing assets. However, such security mechanisms typically do not address the protection of assets and the information contained therein once a security exception has occurred. In various embodiments, the present disclosure describes systems and methods for implementing a security mechanism for the physical protection of data in response to a security exception in a computing data center (e.g., an unauthorized entry to part of the data center).

Figure 1:
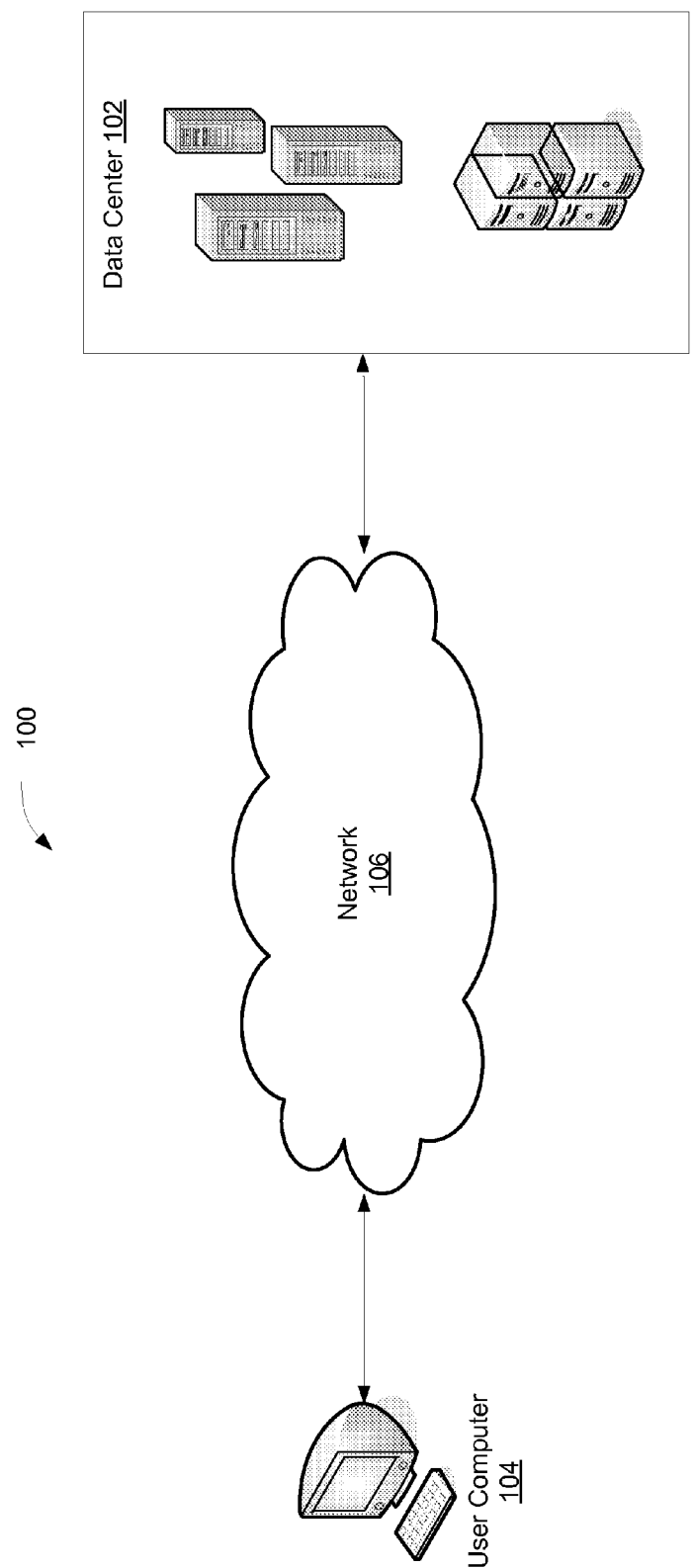
FIG. 1 depicts an example computing environment wherein aspects of the present disclosure can be implemented.

FIG. 1 illustrates an example computing environment in which the embodiments described herein may be implemented. FIG. 1 depicts an illustrative operating environment 100 that includes a data center 102 that provides computing resources. Data center 102 can provide computing resources for executing an application on a permanent or an as-needed basis. The computing resources provided by the data center 102 may include various types of resources, such as data processing resources, data storage resources, data communication resources, and the like. Each type of computing resource may be general-purpose or may be available in a number of specific configurations. For example, data processing resources may be available as virtual machine instances ("instances"). The instances may be configured to execute applications, including Web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example. While the data center 102 is shown as a single data center structure, it should be apparent that data center 102 can include multiple data centers, each of which can house computing resources. The multiple data centers can be situated in the same location or situated in different locations.

The data center 102 is utilized to house and operate computer systems and associated components. The data center 102 can include redundant and backup power, communications, cooling, and security systems.

The customers and other consumers of the data center 102 may access the computing resources provided by the data center 102 over a network 106. It should be appreciated that network 106 can include a local-area network ("LAN"), the Internet, or any other networking topology known in the art that connects the data center 102 to remote consumers of the data center 102. It should also be appreciated that combinations of such networks might also be utilized.

The user computer 104 is a computer utilized by a customer or other consumer of the data center 102. For instance, the user computer 104 may be a server computer, a desktop or laptop personal computer, a tablet computer, a wireless telephone, a personal digital assistant ("PDA"), an e-book reader, a game console, a set-top box, or any other computing device capable of accessing the data center 102. Although only one user computer 104 is depicted it should be appreciated that there may be multiple user computers.

The user computer 104 may be utilized to configure aspects of the computing resources provided by the data center 102. In this regard, the data center 102 might provide a Web interface through which aspects of its operation may be configured through the use of a Web browser application program executing on the user computer 104. Alternatively, a stand-alone application program executing on the user computer 104 might access an application programming interface ("API") exposed by the data center 102 for performing the configuration operations. Other mechanisms for configuring the operation of the data center 102, including deploying updates to an application, might also be utilized.

Figure 2:
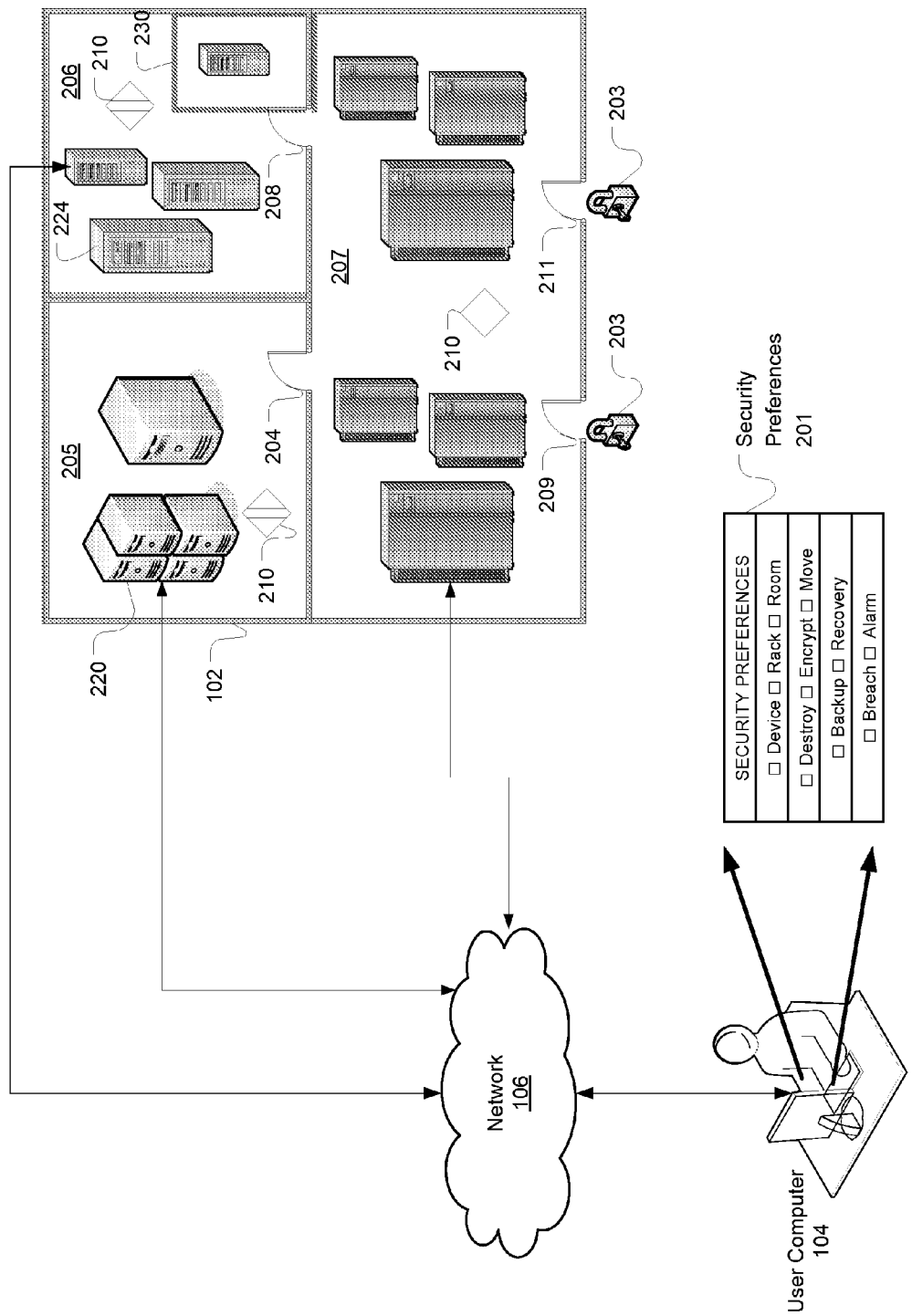
FIG. 2 depicts an example data center wherein aspects of the present disclosure can be implemented.
Figure 3:
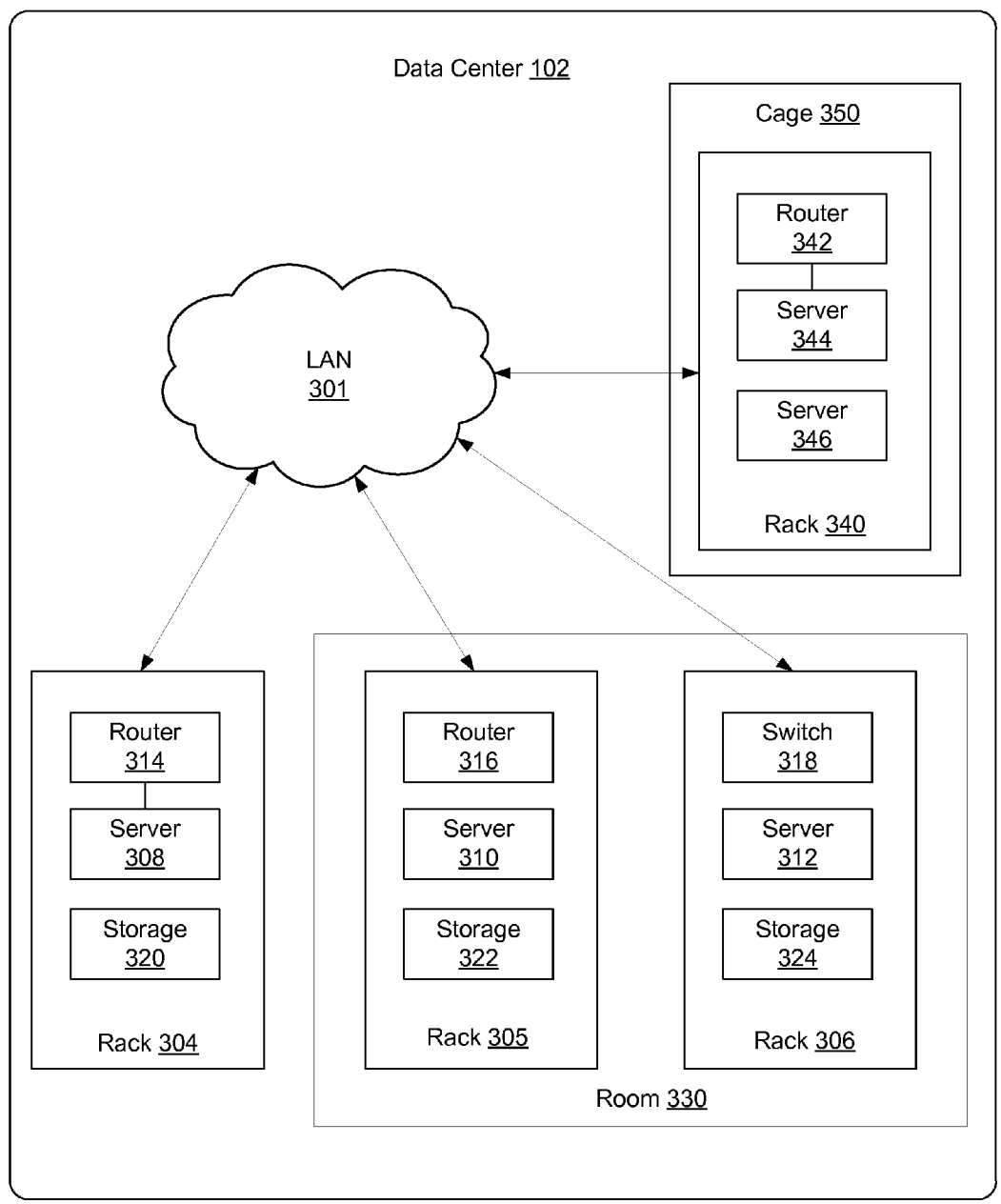
FIG. 3 depicts an example data center wherein aspects of the present disclosure can be implemented.

FIG. 2 provides further detail to the example environment shown in FIG. 1. As shown by the figure, the data center 102 may include rooms 205, 206 and 207. Secured access to the rooms 205, 206 and 207 may be provided by secured doors 204, 208, 209, and 211. The rooms 205, 206, and 207 may include various computing devices such as servers 220 and racks (as shown in FIG. 3 as racks 304, 305, 306). Furthermore, room 206 may include a sub-room 230 that contains additional computing resources. Outside access to data center 102 may be provided by a secured lock 203. Additionally, each room may include a sensor 210 that may, for example, be a motion detector that can signal an alarm when motion of an object is detected in the room. Some of the racks may be housed in a cage with each cage having a secured door and a sensor that can report when the door to the cage is opened or compromised, e.g., forced open. As shown in the embodiment herein, a user at user computer 104 can set security preferences 201 through a user interface such that the level of security, and thus, a security action plan can be set for each physically isolatable unit, such as rooms 205, 206, 207, a sub-room 230, a cage, or a rack. Such security preferences can be changed by the user and the provider of the physical security control system can charge a fee to the user for applying, changing, or otherwise interacting with the security preferences.

FIG. 3 depicts further aspects of data centers in accordance with the present disclosure. In this example, data center 102 may include multiple server racks 304, 305, 306, and 340 which are communicatively linked via LAN 301. The data center 102 may include any suitable number of server racks although, for clarity, only four are shown in FIG. 3. Each server rack 304, 305, 306, and 340 may participate in maintaining services such as electric power and data communications to multiple server computers 308, 310, 312, 344 and 346. Server racks 304, 305, 306, and 340 may include any suitable number of server computers. For example, servers 220 depicted in FIG. 2 could all be running on a single rack or could be spread across multiple server racks. Rack 305 and 306 are shown herein as located in room 330, which is a physically isolatable unit that can have a specific physical security action plan implemented on racks 305 and 306 should a security event occur. Rack 340 is shown located in a cage 350, which is also a physically isolatable unit that can have a specific physical security action plan implemented on rack 340 and any other resources contained in cage 350 should a security event occur. Additionally, each of racks 304, 305, 306, and 340 may also be considered a physically isolatable unit if the racks include a mechanism for detecting a security exception such as a locked panel with a sensor.

In FIG. 3, server racks 304 and 305 are depicted as including rack routers 314 and 316. Rack 306 is shown as including a rack switch 318. The rack routers and switch may be responsible for switching packets of digital data to and from their respective sets of server computers 308, 310, 312. The rack routers and switch may be communicatively linked to a LAN 301 and then to additional routers that connect the data center 102 to one or more other computer networks including the Internet. Each rack can also include resident storage 320, 322, 324 for data of varying levels of importance that require corresponding levels of physical security.

Figure 4:
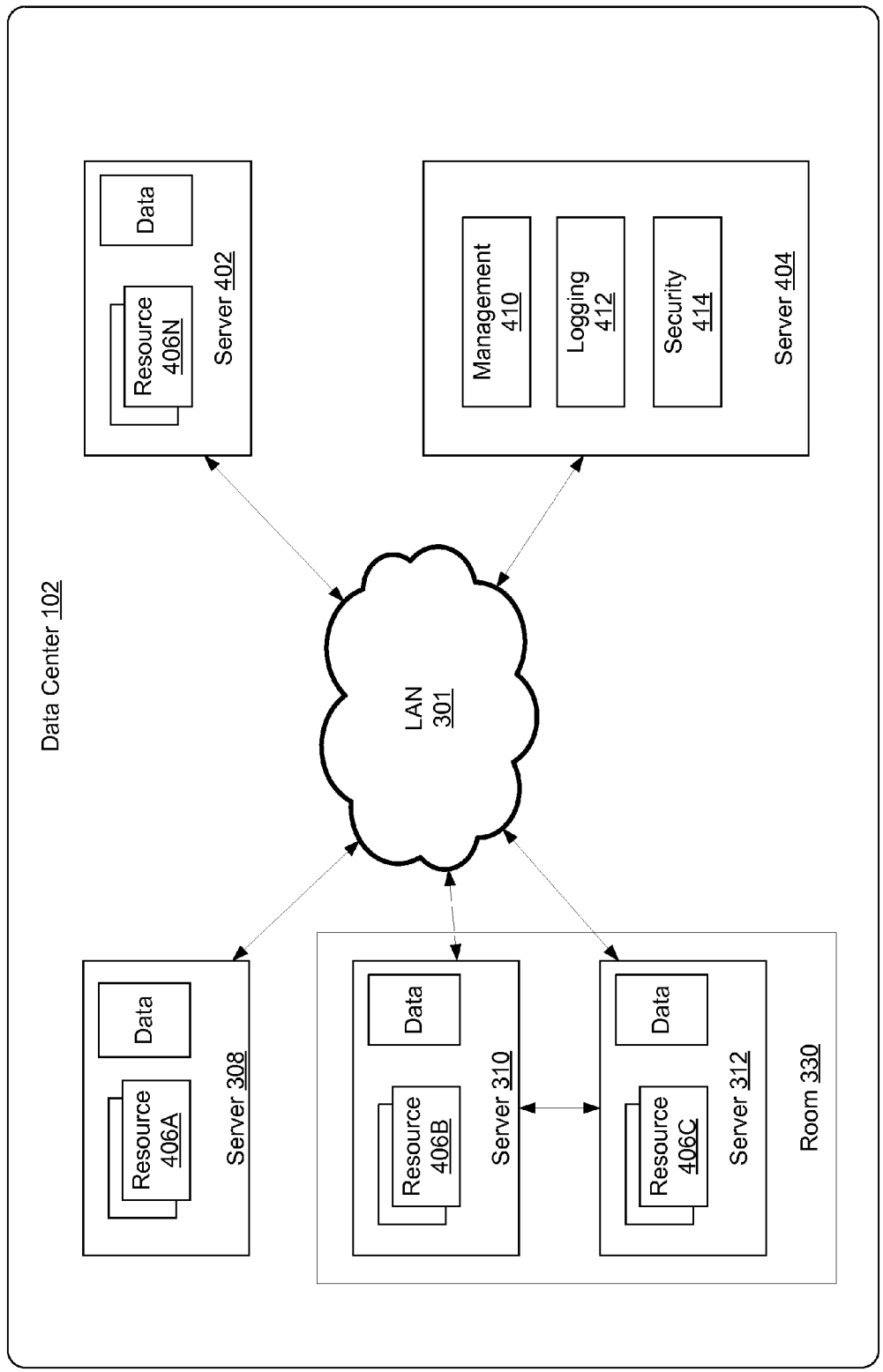
FIG. 4 depicts an example operational environment for practicing aspects of the present disclosure.

FIG. 4 is a computing system diagram that illustrates one configuration for a data center 102, including some of the concepts and technologies disclosed herein for physically securing data using a security policy. The data center 102 shown in FIG. 4 includes server computers 308, 310, 312, 402 and 404 for providing computing resources for executing one or more applications. The server computers 308, 310, 312, 402 and 404 may be standard server computers configured appropriately for providing the computing resources described above. For instance, in one implementation the servers 308, 310, 312, and 402 are configured to provide the computing resources 406A, 406B, 406C, and 406N.

In one embodiment, the computing resources 406A, 406B, 406C, 406N (which may be referred herein singularly as "a computing resource 406" or in the plural as "the computing resources 406") may be virtual machine instances. As known in the art, a virtual machine instance is an instance of a software implementation of a machine (i.e., a computer) that executes programs much like a physical machine executes programs. In the example of virtual machine instances, each of the servers 308, 310, 312, 402 and 404 may be configured to execute an instance manager capable of executing the instances. The instance manager might be a hypervisor or another type of program configured to enable the execution of multiple computing resources 406 on a single server 308, for example. As discussed above, each of the computing resources 406 may be configured to execute all or a portion of an application.

It should be appreciated that although the embodiments disclosed above discuss the context of virtual machine instances, other types of instances can be utilized with the concepts and technologies disclosed herein. For example, the technologies disclosed herein might be utilized with instances of storage resources, processing resources, data communications resources, and with other types of resources. The embodiments disclosed herein might also be utilized with computing systems that do not utilize virtual machine instances.

The data center 102 shown in FIG. 4 also may also include a server computer 404 reserved for executing software components for managing the operation of the data center 102, the server computers 308, 310, 312, and 402, and the resources 406. In particular, the server computer 404 might execute a management component 410. As discussed above, a customer of the data center 102 might utilize the user computer 104 to access the management component 410 to configure various aspects of the operation of data center 102 and the resources 406 purchased by the customer. Resources 406 can include applications and other services provided by the data center 102 such as virtual machine sessions. For example, the customer may purchase access to one or more virtual machine instances and make changes to the configuration of the virtual machine instances. The customer might also specify settings regarding how the purchased virtual machine instances are to be scaled in response to demand. Any of the computers described herein can include at least one processor, a memory communicatively coupled to the processor when the system is operational, with the memory having stored therein computer instructions, that upon execution by the at least one processor, cause various computer implemented steps to be performed.

In the example of data center 102 shown in FIG. 4, LAN 301 is utilized to interconnect the server computers 308, 310, 312, 402 and 404 and the server computer 404. The LAN 301 is also connected to the network 106 illustrated in FIG. 1. It should be appreciated that the network topology illustrated in FIG. 4 has been greatly simplified and that many more networks and networking devices may be utilized to interconnect the various computing systems disclosed herein. Appropriate load balancing devices or software modules might also be utilized for balancing a load between multiple data centers, between each of the server computers 308, 310, 312, and 402, and between resources 406 purchased by each customer of the data center 102. These network topologies and devices should be apparent to those skilled in the art.

It should be appreciated that the data center 102 described in FIGS. 1, 2, 3 and 4 is merely illustrative and that other implementations might be utilized. Additionally, it should be appreciated that the functionality disclosed herein might be implemented in software, hardware, or a combination of software and hardware. Other implementations should be apparent to those skilled in the art.

As illustrated in FIG. 4, the server computer 404 is also configured in one embodiment to execute a logging component 412 and a security component 414. The logging component 412 is configured to control various aspects of computing activity performed by the resources 406. For example, the logging component 412 might log DNS lookup operations (which might also be referred to herein as "DNS queries") performed by the resources 406, incoming and outgoing network traffic to and from the resources 406, data processing and data storage operations performed by the resources 406, and virtually any other type of computing activity performed by the resources 406. Although the logging component 412 is illustrated in FIG. 4 as executing on the server computer 404, it should be appreciated that all or a portion of the logging component 412 might be executed on the server computers 308, 310, 312, 402 and 404 or other computer systems.

The security component 414 is configured to manage various security aspects of the data center 102. For example, the security component 414 might implement security mechanisms using a security component 414 to protect the integrity of user data and guard against unauthorized access to the various services and components provided in data center 102. Although the security component 414 is illustrated in FIG. 4 as executing on the server computer 404, it should be appreciated that all or a portion of the security component 414 might be executed on the server computers 308, 310, 312, 402 and 404 or other computer systems.

In one embodiment, a data center 102 is configured to provide computation and storage services and to physically secure data using a security exception response plan. As discussed above, data center 102 may include one or more physically isolatable units that comprise discrete physical computing assets. In an embodiment, security component 414 in data center 102 identifies a set of computing resources for which a physical security exception response plan is to be provided. This may be based on physical data security preferences received from a customer receiving hosting services from the data center 102. As discussed above, the physical data security preferences may identify the desired level of security (e.g., room level or rack level security), backup settings (e.g., whether a complete backup of the user's data is desired), the response to a security exception (e.g., delete data or move data to a secure location), and the like. Based on the identified set of computing resources and the physical data security preferences, a security exception response plan for the computing data center's physically isolatable units are determined. The security exception response plan identifies actions to be performed upon detection of a security exception for each of the identified computing resources. Upon determining that a security exception has occurred at the computing data center 102 that indicates that there is a heightened risk that at least a portion of the computation, storage, or network resources could be compromised, the security component 414 implements the security exception response plan on potentially affected computing resources. The security component 414 may, for example, remove data from the physically isolatable units and make the removed data available elsewhere.

In an embodiment, security component 414 may monitor the authentication and authorization of users accessing a particular physical space in the data center 102. Such a physical space can be any physically isolatable asset in the data center, such as a rack, a room, or the building. For example, access to an equipment rack may require authentication of a user authorized to access the rack. Authentication may include use of access methods known in the art such as an identification (ID) card, entry of a personal identification number (PIN), entry and analysis of biometric information such as a fingerprint reader, and the like.

Authorization may also include maintaining a whitelist of persons who are authorized to access a rack or enter a room or building. Such a whitelist may further be restricted in accordance with the date or time of day, or other constraints.

In addition to authorization and authentication, physical security exceptions may result from alarms or other such warning indications when unexpected events occur. For example, a door in the data center 102 may have been forced open rather than being opened in response to a positive authorization. As another example, motion detectors or pressure sensors in the floor may sense motion in an area in which a person is not expected.

In an embodiment, the data center 102 may include a capability to relocate computation, storage, and network resources into and out of a particular physical space such as a rack, room, or the building itself. For example, in the case of a computation resource implementing a virtual machine, relocation of a particular computation resource can be accomplished by stopping the execution of a virtual machine in one physical space, migrating the virtual machine to another physical space, and restarting the virtual machine. As another example, a physical server may simply be powered off to prevent access to any processes executing therein.

Figure 5:
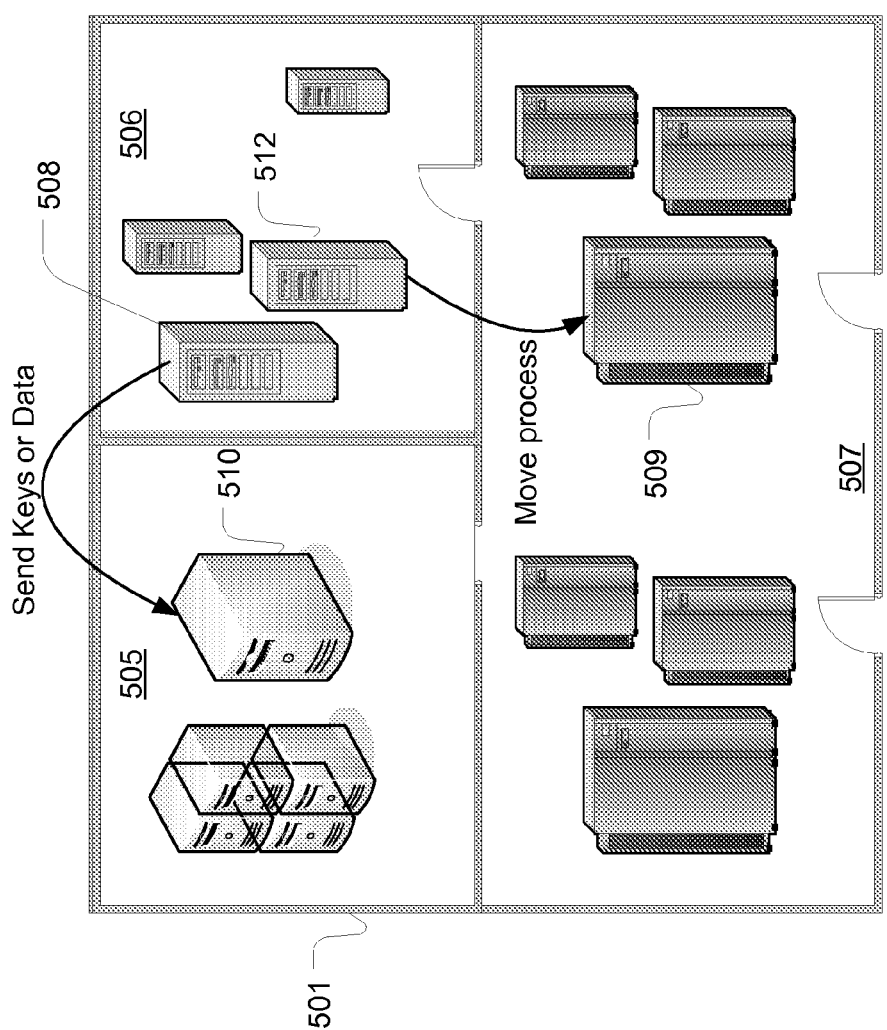
FIG. 5 illustrates an example embodiment of the methods disclosed herein.

In an embodiment depicted in FIG. 5, data center 501 has rooms 505, 506, and 507 that each contain computing and storage resources. In this example, data associated with a customer for whom a security exception response plan has been established may be stored on a storage device 508 in room 506. Additionally, a process associated with the customer may be running in computing device 512 in room 506. Suppose in this example that the customer has provided preferences and a physical security action plan is in place. Upon determining that a security exception associated with room 506 has occurred, a security component can process the security action plan and determine that customer's data and resources are to be removed from room 506. In response to this determination, a service can cause the customer data stored in storage device 508 in room 506 can be migrated to in room 505. Furthermore, the process running on computing device 512 can be migrated to computing device 509 in room 507. In one embodiment, the data sent to room 507 can be encrypted and the key or keys for the encryption may be sent to the servers of room 505 such that the data can be accessed in the new location. Additionally and optionally, the process running on computing device 512 in room 506 can be deleted.

Figure 6:
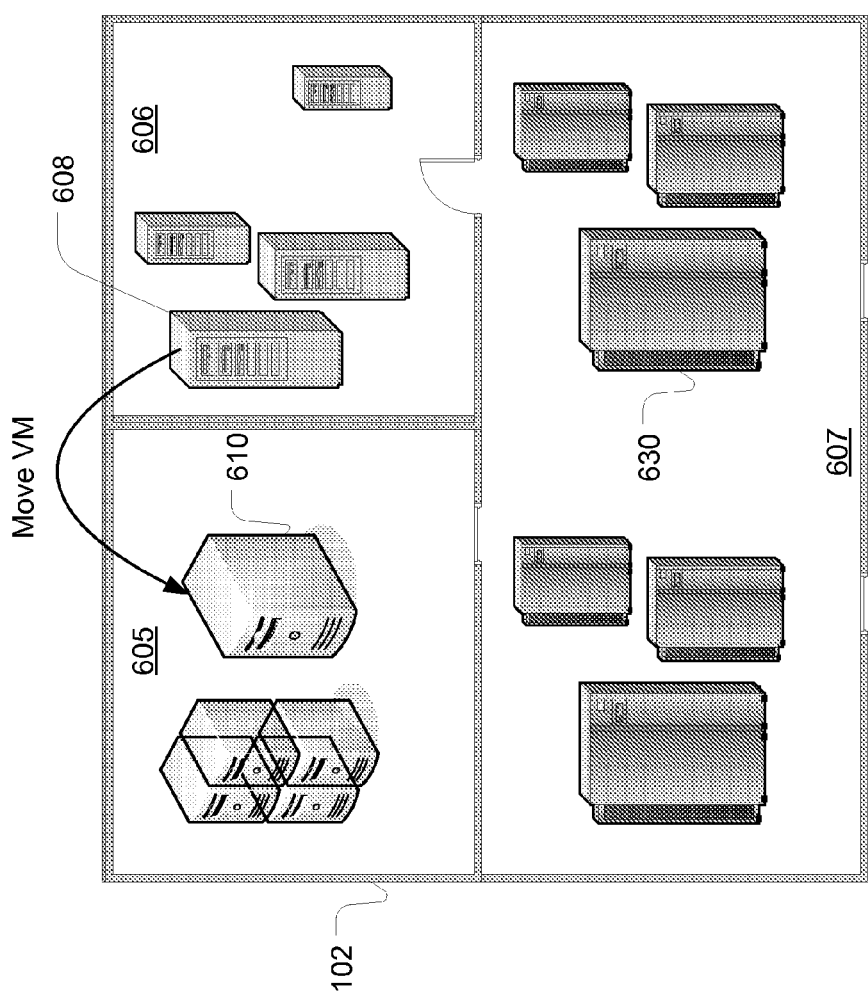
FIG. 6 illustrates an example embodiment of the methods disclosed herein.

In another embodiment depicted in FIG. 6, a virtual machine may be executing on a server 608 in room 606 and an associated storage device 630 that the virtual machine uses may be located in another room 607. In this example, since the virtual machine data is stored in a different room, the virtual machine is migrated to server 610 in room 605 or simply shut down in response to a security event associated with room 606.

In the case of storage resources, a stored asset may be copied, stored in another physical space, and deleted from the compromised physical location. As another example, stored assets that are encrypted may be secured by deleting all copies of the decryption keys that are stored in the compromised physical location. In some embodiments, at a time after the security exception occurs, the data associated with the room that is associated with the security exception is encrypted and the keys deleted, potentially after making the data available in another secure location.

Furthermore, routing tables may be changed to avoid routers/network devices and computing resources located in the compromised physical space and thus prevent network flows from entering the compromised physical space.

In an embodiment, when an alarm or other event is triggered, the security component 414 may immediately and automatically initiate a migration of one or more computation, storage, and/or network flows out of the physical space in which the event has been determined to have occurred. When the alarm or event is cleared, the migrated flows may be restored to their original physical space. The event that triggers the response may be any type of planned or unplanned event. Examples of planned events can include scheduled access to the data center by maintenance personnel, or changes to the configuration of the data center. Examples of unplanned events include unauthorized access to a secured rack, unscheduled entry to a room in the data center, natural disaster events such as flooding of a data center, and the like.

Figure 7:
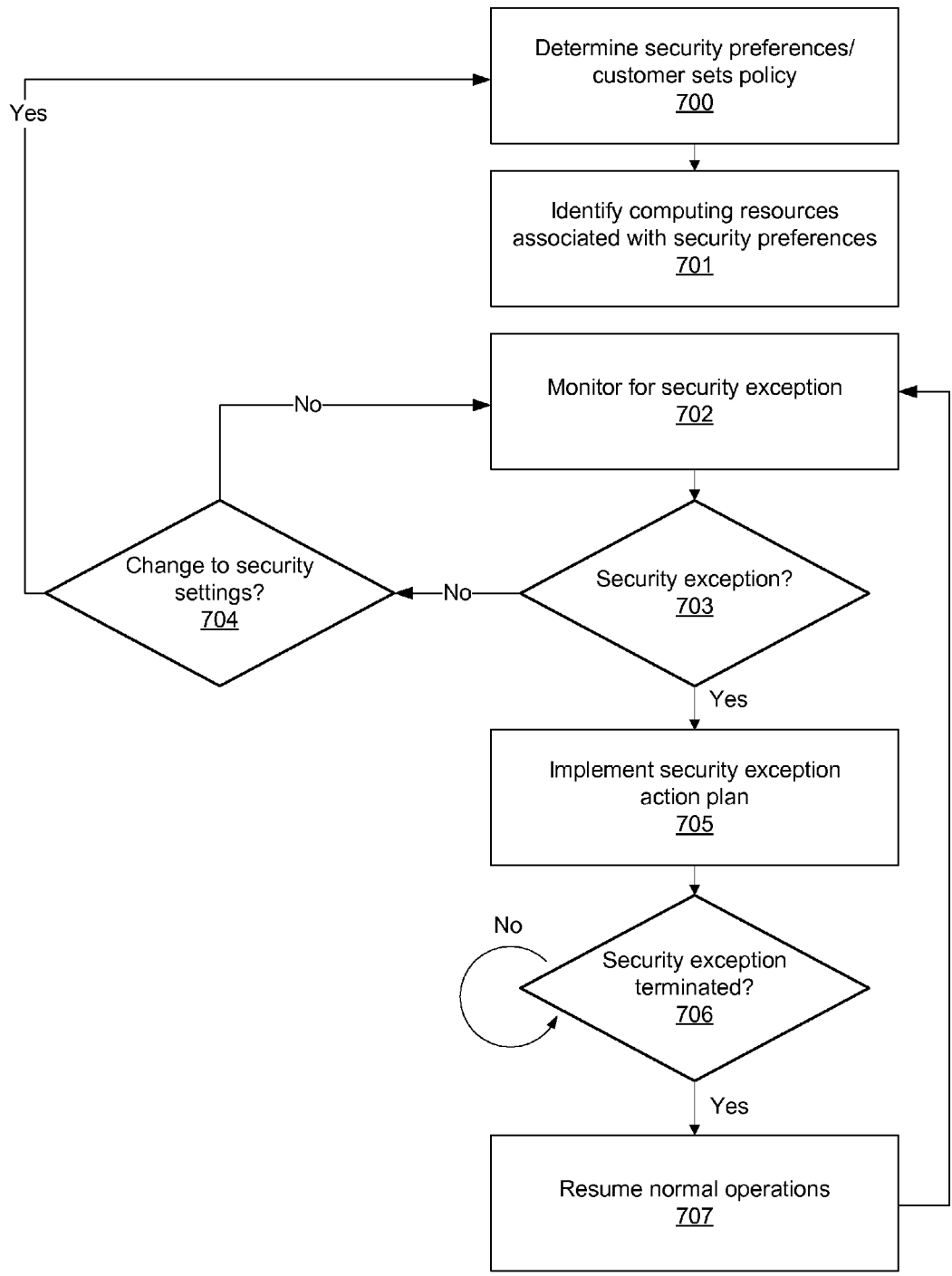
FIG. 7 illustrates an example of an operational procedure for physically securing data using a security policy.

FIG. 7 depicts an example operational procedure for physically securing data in a data center. The computing data center may be configured to provide at least computation and/or storage services and may further comprise one or more physically isolatable units comprising discrete physical computing assets such as servers and storage devices (such as Virtual Machine (VM) data storage 630 in FIG. 6). The computing data center may be configured to host one or more computing resources on behalf of one or more users.

Operation 700 illustrates determining security preferences for the user. For example, in the example depicted in FIG. 2, a user at a user computer 104 may request or manage computing resources via a network 106. For example, the user may request and manage computing resources including virtual machines, applications and/or a fixed amount of storage. The user may further provide security preferences 201 which may include physical asset options, security breach options, and backup/recovery options. In an embodiment, the user can enter the security preferences 201 into a web-page or the like. In the example shown in FIG. 2, a web page may include fields that a user can use to select the different security options. In one embodiment, the user may specify that the user's data and applications should be isolated to a single physically isolatable unit such as a rack, cage, or room. In other embodiments, the actual physical distribution of the user's data and applications may be transparent to the user.

A user interface may be provided to the user for facilitating the selection and receipt of the physical data security preferences that can be used to define a security exception response plan for the user. For example, a Web interface may be provided through which aspects of physical data security preferences may be configured through the use of a Web browser application program executing on the user computer 104. Alternatively, a stand-alone application program executing on the user computer 104 might access an application programming interface ("API") exposed by an entity managing the computing resources in the data center 102 for configuring physical data security preferences. For example, a web services API can be provided so that a computing customer can provide preferences for physical security settings. In some embodiments the customer may be charged different service rates depending upon the selected security preferences. Other mechanisms for configuring the physical data security preferences may also be utilized.

Operation 701 illustrates that, based at least in part on the physical data security preferences received from the user, a set of the computing resources for which a physical security exception action plan is to be provided is identified. The physical data security preferences may include at least a physical security setting for one or more physically isolatable units. A physically isolatable unit can be one or more equipment racks or other such physical units. For example, it may be determined that the user's data is stored in a storage device in a rack, and that the user's applications are executing in a server mounted in the same rack.

Operation 702 illustrates monitoring whether a physical security exception has occurred at the computing data center. A physical security exception may for example, be any event that may be detected by a system at the data center that may indicate an exception to the physical data security preferences received from the user. For example, a security exception may be a failure to authorize or authenticate a person physically entering or otherwise accessing a rack, room or any physically isolatable unit in the data center, including the data center itself.

In response to determining that a physical security exception has occurred 703, the security exception action plan may be implemented 705. For example, if not already known, it may be determined which computing assets are executing, storing, or otherwise hosting the services associated with the user and for which the above described security exception action plan is to be provided. The identified set of computing resources may be removed or otherwise made unavailable so that the physical data security preferences can be met in accordance with the security exception action plan. The removed computing resources may be made available elsewhere. In one embodiment, the computing resources may be made available from a physically secure location that meets the physical data security preferences established for the user. For example, data that is stored within a set of computing resources that are potentially vulnerable because of the security breach may be stored at another physical location and the data on the vulnerable set of computing resources may be deleted or otherwise made unavailable to an unauthorized person.

In one embodiment, each rack, cage, room, and data center can be assigned to a physical unit identifier. During the determining step, the security component can use a customer identifier to generate a list of physical unit identifiers that are currently associated with the customer identifier. This query could be executed periodically to keep the mapping accurate. When a sensor in a room triggers an event, the security component can determine its physical unit identifier and determine which customers are impacted. The security component can consult the security exception action plan for the customer as well as any other customers and take an appropriate action.

The user's data and applications may be protected in other ways so that the computing resources hosting the data and applications are substantially protected from unauthorized physical access. For example, data associated with the vulnerable set of computing resources may have been previously encrypted or can be encrypted as a result of the breach, and the decryption keys can be stored in a secure location and deleted from any assets that are vulnerable because of the security exception. Decryption keys are merely an example and any data that is operable to decrypt the encrypted data may be stored in a manner that is protected from the security exception.

Additionally and optionally, routing tables and policies may be adjusted to avoid communications with network devices located in the vicinity of the physical security exception. For example, routing paths may be revised so that a router that is known to reside in a room that has been breached is bypassed and alternative routing paths are used. In this manner data communications between computing and/or storage resources that are not directly impacted by the security exception can avoid any compromised areas in the data center and thus avoid being potentially subjected to unauthorized access and tampering.

The data center may also determine if any changes to the security settings should be implemented 704. Changes to the security settings may be in response to a request for a change from a user, or in response to changes in the configuration of computing resources in the data center 102.

Operation 706 illustrates a determination that the security exception has been terminated. For example, the security exception may have been determined to have been a false alarm, and the appropriate security and control systems may be notified automatically or manually by an administrator. In response to the determination, operation 707 illustrates resuming normal operations in accordance with the security exception action plan. For example, the identified set of the computing resources can be resumed and any data or applications that were moved or migrated may be returned to their former locations. Alternatively, the migrated resources can stay where they are.

In many cases, the rapid, wholesale migration of computing processes and data may be expensive and/or time consuming. Thus in some embodiments, a mechanism can be provided for designating particular compute, storage, and network flows as "physical security critical." Only those designated flows may be migrated or otherwise made unavailable during a security event or breach. More generally, a priority scheme may be implemented that allows for the most security critical assets and flows to be migrated or secured first before less critical assets are migrated or secured. Alternatively, the priority can be based on whether the user has selected and paid to have such priority mechanism activated.

Figure 8:
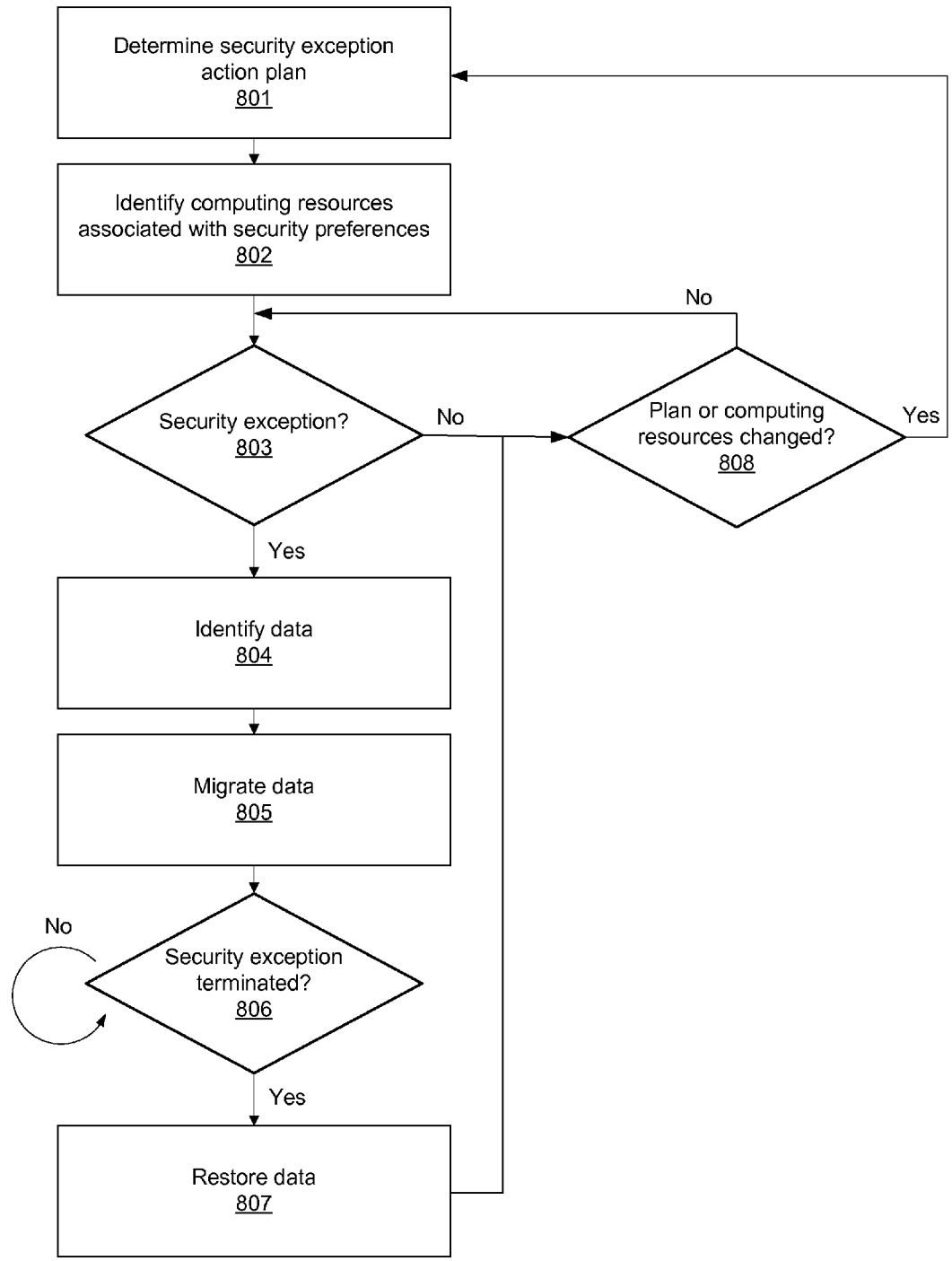
FIG. 8 illustrates an example of an operational procedure for physically securing data using a security policy.

FIG. 8 depicts another example operational procedure for physically securing data in a computing data center. Operation 801 illustrates determining a security exception action plan for a user's hosted computing resources. The security exception action plan may be for the user's requested computing resources such as applications and data storage. The user may further provide security preferences which may include physical asset options, security breach options, and backup/recovery options.

Operation 802 illustrates that, based at least in part on the security exception action plan, a set of the computing services for which the security exception action plan is to be provided is identified. Operation 803 illustrates a determining whether a physical security exception has occurred at the computing data center. In response to determining that a physical security exception has occurred, operation 804 illustrates that a security component (such as security component 414 in FIG. 4) may determine which data may be potentially compromised as a result of the security exception and for which the security exception action plan is to be provided. The identified data may be migrated in operation 805 such that the security exception action plan can be met. The migrated data may be made available elsewhere. In one embodiment, the migrated data may be made available from a physically secure location that satisfies a condition specified in the security exception action plan established for the user. For example, the security exception action plan may include a condition indicating that the data may be moved to any location that is not experiencing a security exception. Additionally and optionally, the security exception action plan may include a condition indicating that the data may be moved to a location that is not experiencing a security event and the security exception action plan may specify that the data needs to be moved to a location that satisfies regulatory and compliance requirements, e.g., HIPAA regulations, ITAR regulations, banking and financial regulations, etc.

If no physical security exception has occurred, then in operation 808 it is determined whether there have been any changes to the security exception action plan or computing resources. If there have been changes, then the operational procedure returns to operation 801 and operation 802 to determine the security exception action plan and identify computing resources associated with the plan.

Operation 806 illustrates a determination as to whether the physical security exception has been terminated. For example, an unauthorized user may have triggered the security exception by entering a room hosting the data and the exception may be terminated when the security component receives an indication that security personnel have responded to the exception. In response to the determination, at operation 807, the migrated data may be restored and/or moved back to its former location. In some embodiments the migrated data stays in its new location.

Any of the above mentioned aspects can be implemented in methods, systems, computer readable media, or any type of manufacture. For example, a computer readable medium can store thereon computer executable instructions for physically securing data in a computing data center. Such media can comprise a first subset of instructions for allowing access, in the computing data center, one or more computing resources to a user; a second subset of instructions for, based at least in part on physical data security preferences associated with the user, identifying a set of the computing resources for which a physical security exception action plan is to be provided; a third set of instructions for determining that a physical event has occurred at the computing data center; and a fourth set of instructions for, in response to said determining, applying the physical security exception action plan on the identified set of computing resources. It will be appreciated by those skilled in the art that additional sets of instructions can be used to capture the various other aspects disclosed herein, and that the four presently disclosed subsets of instructions can vary in detail per the present disclosure.

Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing system via inter-computer communication. Some or all of the system modules and/or data structures may also be stored (e.g., as software instructions or structured data) on a computer-readable medium, such as a hard disk, a memory, a network, or a portable media article to be read by an appropriate drive or via an appropriate connection. The system modules and data structures can also be transmitted via generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A computing data center configured to provide computing resources, the computing data center comprising:
    one or more physically isolatable units comprising discrete physical computing assets;
    a computing device comprising at least one processor and a memory communicatively coupled to said processor when said computing device is operational, said memory having stored therein computer readable instructions that, upon execution by the computing device, cause the computing device to at least:
        provide, in the computing data center, one or more computing resources on behalf of a user within the one or more physically isolatable units;
        based at least in part on physical data security preferences received from the user, identify a set of the computing resources for which a physical security exception action plan is to be applied and identify physical computing assets that are providing the identified set of computing resources for which the physical security exception plan is to be applied;
        determine that a security exception at the one or more physically isolated units associated with the identified physical computer assets has occurred; and
        in response to the determination, and according to the physical security exception action plan, remove the identified set of computing resources from within the one or more physically isolatable units.

2. The computing data center of claim 1, wherein the memory further comprises computer readable instructions that, when executed by the computing device, cause the computing data center to at least:
    make the removed computing resources unavailable from the identified physical computing assets; and
    make available the removed computing resources from a physically isolatable unit that satisfies a condition specified in the physical security exception action plan.

3. The computing data center of claim 1, wherein the memory further comprises computer readable instructions that, when executed by the computing device, cause the computing data center to at least reallocate the identified physical computing assets such that:
    the identified set of the computing resources are relocated to a location that satisfies the security exception action plan; and
    use of the identified set of the computing resources can be resumed when the security exception is terminated.

4. A computer-implemented method of securing computing resources, the method comprising:
    allocating, by a computing device, one or more computing resources available for access by a user, the computing resources associated with one or more physically isolatable units and the computing resources associated with one or more user options for physical data security of the computing resources;
    determining, by the computing device, that a physical event has occurred in at least one of the physically isolatable units; and
    in response to said determining, causing, by the computing device, at least one of the one or more computing resources running within the at least one of the physically isolatable units to be inaccessible.

5. The method of claim 4, wherein the physically isolatable units are substantially isolated to one of an equipment rack, a room, or a building.

6. The method of claim 4, wherein said causing is in accordance with a security exception action plan that is based on the user options for physical data security preferences received from the user.

7. The method of claim 4, wherein said causing comprises stopping a virtual machine and migrating the virtual machine to a physically isolatable unit unaffected by the physical event.

8. The method of claim 4, further comprising storing data associated with the at least one of the physically isolatable units at a physically isolatable unit unaffected by the physical event and deleting corresponding data from the at least one of the physically isolatable units.

9. The method of claim 4, wherein data associated with the at least one of the physically isolatable units is encrypted, and said causing comprises deleting data operable to decrypt the data.

10. The method of claim 4, wherein said causing comprises adjusting routing of network traffic to avoid network devices associated with the at least one of the physically isolatable units.

11. The method of claim 4, wherein said physical event comprises a failure to authenticate or authorize a person accessing a physically isolatable unit.

12. The method of claim 4, wherein data associated with the at least one of the physically isolatable units is stored in a location unaffected by the physical event, and wherein said causing comprises shutting down at least one of the one or more computing resources at the at least one of the physically isolatable units.

13. The method of claim 6, further comprising providing an application programming interface operable to receive the physical data security preferences from the user.

14. The method of claim 6, wherein said security exception action plan is provided at one of a plurality of service levels, further comprising charging a fee based on the service level.

15. A system comprising:
at least one processor, a memory communicatively coupled to said processor when said system is operational, said memory having stored therein computer instructions that upon execution by the at least one processor cause:
based at least in part on physical data security preferences received from a user, identifying one or more computing resources for which a physical security exception action plan is to be provided, the one or more computing resources being hosted on behalf of the user;
determining that a physical security exception has occurred;
identifying physical computing assets that are providing the identified computing resources for which the physical security exception action plan is to be provided; and
in response to said determining, implementing the physical security exception action plan on the identified computing resources.

16. The system of claim 15, wherein said implementing further comprises:
making data unavailable from the identified physical computing assets; and
making the data available from a physically secure location that meets the physical security exception action plan.

17. The system of claim 15, wherein said making data unavailable further comprises reallocating the identified physical computing assets such that:
the identified set of the computing resources for which the physical security exception action plan is to be provided is substantially protected from unauthorized physical access; and
the identified set of the computing resources can be resumed upon expiration of the physical security exception.

18. A non-transitory computer readable storage medium comprising:
instructions for allowing access to one or more computing resources by a user;
instructions for identifying a set of the computing resources for which a physical security exception action plan is to be provided based on user's physical security preferences;
instructions for determining that a physical event has occurred; and
instructions for, in response to said determining, applying the physical security exception action plan to the identified set of computing resources based on a location of the physical event and a location of computing assets providing the set of the computing resources.

19. The non-transitory computer readable storage medium of claim 18, wherein applying said physical security exception action plan comprises stopping a virtual machine.

20. The non-transitory computer readable storage medium of claim 19, further comprising instructions for migrating the virtual machine to a computing device in a location that is not affected by the physical event.

21. The non-transitory computer readable storage medium of claim 18, further comprising instructions for moving data associated with the identified set of computing resources to a physical location that satisfies a condition specified in the physical security exception action plan.

22. The non-transitory computer readable storage medium of claim 18, wherein said physical security exception action plan comprises reconfiguring routing of network traffic to avoid network devices associated with the location of computing assets providing the set of the computing resources.

* * * * *